United States Patent [19]
Zeldin

[11] Patent Number: 5,793,975
[45] Date of Patent: Aug. 11, 1998

[54] ETHERNET TOPOLOGY CHANGE NOTIFICATION AND NEAREST NEIGHBOR DETERMINATION

[75] Inventor: Paul Zeldin, Los Altos, Calif.

[73] Assignee: Bay Networks Group, Inc., Santa Clara, Calif.

[21] Appl. No.: 609,281

[22] Filed: Mar. 1, 1996

[51] Int. Cl.$^6$ ................................................. G06F 15/16
[52] U.S. Cl. ........................... 395/200.54; 395/200.72
[58] Field of Search ...................... 395/200.1, 200.11, 395/200.53, 200.54, 200.72; 370/400, 401, 409, 351

[56] References Cited

U.S. PATENT DOCUMENTS

| | | | |
|---|---|---|---|
| 5,226,120 | 7/1993 | Brown et al. | 395/161 |
| 5,606,664 | 2/1997 | Brown et al. | 395/200.1 |
| 5,606,669 | 2/1997 | Bertin et al. | 395/200.15 |

FOREIGN PATENT DOCUMENTS 5-0136794  6/1993  Japan.

*Primary Examiner*—Mehmet B. Geckil
*Attorney, Agent, or Firm*—Blakely, Sokoloff, Taylor & Zafman LLP

[57] ABSTRACT

It is desirable to be able to automatically map the topology of a computer network. To automatically map the topology of a computer network, a new method is proposed. First, all the network management modules (NMMs) in the network start off broadcasting multicast packets informing other units of their presence. When a network management module detects that only a single unit is connected to a particular slot-port combination, then that network management module designates the single unit as being a downstream unit in a network topology table. After updating its network topology table, the network management module sends a quench packet to the single unit to silence the downstream unit. These steps are repeated for all occurrences of a single unit connected to a particular slot-port combination in that network. After this occurs, the very bottom layer of the network has been detected and it's topology has been mapped. Since this bottom layer has been silenced by the quench packets, the bottom layer units will no longer be sending out the multicast packets. Thus, the next lowest layer can be detected by performing the same set of steps again. Specifically, any slot-pair combination that only has a single unit coupled to it is then marked as being a downstream unit and a quench message is sent to silence that unit. These steps are performed recursively until the entire network topology is detected.

15 Claims, 16 Drawing Sheets

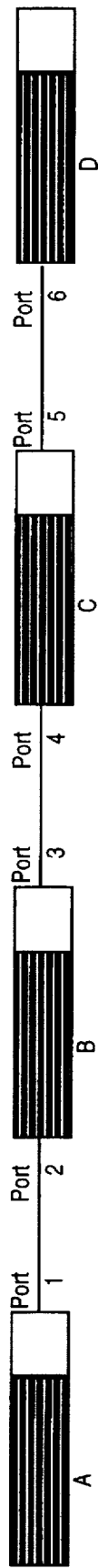

ETHERNET TOPOLOGY CHANGE NOTIFICATION AND NEAREST NEIGHBOR DETERMINATION

FIELD OF THE INVENTION

The present invention relates to the field of computer networks. In particular the present invention discloses the method for determining the topology of an Ethernet network and a method for determining changes in the topology of the Ethernet network.

BACKGROUND OF THE INVENTION

Ethernet is the most popular type of local area network (LAN) for computer systems. Ethernet is based upon Carrier Sense Multiple Access/Collision Detection Technology (CSMA/CD). The original Ethernet networks were constructed using an expensive coaxial wire that coupled all the nodes on the Ethernet network together.

To simplify the wiring of Ethernet networks, 10 Base-T Ethernet was created. 10 Base-T technology allows Ethernet information to be transmitted over less expensive twisted pair wiring. 10 Base-T Ethernet networks became very popular since companies could construct a computer network with simple twisted pair wiring that were already in the building. However, to build an Ethernet network with twisted pair of wires, at least one 10 Base-T Ethernet hub is required (Hubs are also known as concentrators). 10 Base-T Ethernet hubs are centralized switching units that connect to all of the nodes on a 10 Base-T Ethernet network. Every node connected to a hub transmits its information to the hub, and then the hub rebroadcasts that information out to all the other nodes connected to the hub. Although Ethernet started out as a network topology that had no structure, with the advent of hub-based 10 Base-T Ethernet, a structure was imposed on Ethernet networks.

The topology structure of a 10 Base-T Ethernet network can be viewed as a tree structure that starts at a single root. Coupled to the root unit are intermediate units. At the very bottom are leaf units that only have a single connection to another unit.

To manage a 10 Base-T Ethernet network, it is desirable to know the topology of the computer network. In U.S. Pat. No. 5,226,120, Synoptics introduced a technique for automatically determining the topology of a 10 Base-T Ethernet network. However, the Auto Topology Mapping System disclosed in the Synoptics patent has a few disadvantages. For example, the network topology can only be adequately determined by having all the devices in the computer network broadcast with a specific proprietary protocol. Most network administrators are not comfortable when they discover an unknown proprietary protocol on the network they are responsible for. Thus it would be desirable to have an automatic topology mapping system that does not require any proprietary protocol.

SUMMARY OF THE INVENTION

It is therefore object with the present invention to implement a method an apparatus for automatically detecting the topology of an Ethernet network. This and other objects are achieved by the Ethernet Topology Change Notification And Nearest Neighbor Determination apparatus with a present invention.

To determine the network topology, every network management module (NMM) in an Ethernet network starts off sending multicast packets informing other network management modules of its presence. The multicast packets are SONMP packets that are defined in U.S. Pat. No. 5,226,120. When a network management module detects that only a single unit is connected to a particular slot-port combination, then that network management module designates the single unit as being a downstream unit in a network topology table. After updating its network topology table, the network management module sends a quench packet to the single unit to silence it. These steps are repeated for all occurrences of a single unit connected to a particular slot-port combination in that network. After this occurs, the very bottom layer of the network has been detected and it's topology mapped.

Since this bottom layer has been silenced by the quench packets, the bottom layer units will no longer be sending out the multicast packets. Thus, the next lowest layer can be detected by performing the same set of steps again. Specifically, any slot-pair combination that only has a single unit coupled to it is then marked as being a downstream and a quench message is sent to silence that unit. These steps are performed recursively until the entire network topology is detected.

Other objects feature and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which:

FIG. 1a illustrates three units coupled into a network wherein one unit can determine the network topology.

FIG. 1b lists the connectivity of the network illustrated in Figure 1a.

FIG. 1c illustrates four units coupled into a network wherein no unit can individually determine the network topology.

DETAILED DESCRIPTION OF THE PREFERRED EMBODIMENT

Figure 2:
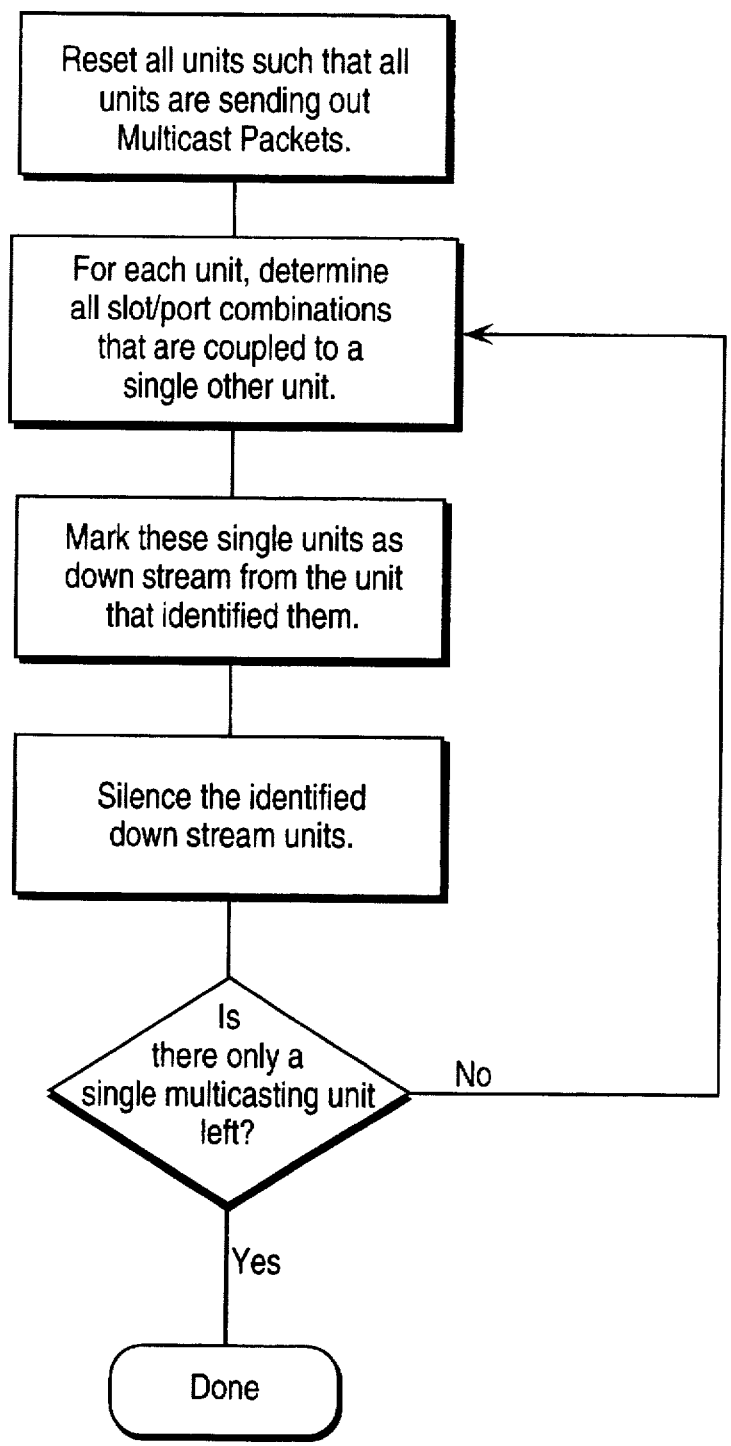
FIG. 2 illustrates a high level flow diagram that describes how the present invention automatically determines the topology of a network.

A method for automatically determining the topology of a computer network is disclosed. The method of the present invention can also detect changes in the topology of a computer network. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Ethernet based computer networks. However, the same techniques can easily be applied to other types of computer networks.

The present invention has currently been implemented in a general purpose computing device that comprises a computer processor, memory, and at least one network port that can be coupled to other computing devices on a computer network. However, the method of the present invention is suitable for use in any network environment where the various nodes can communicate with each other, process incoming packets, and store the results.

Port Tagging

One of the features required to implement the automatic network topology mapping of the present invention is to have network units that perform port-tagging. Port-tagging is a technique wherein all the packets received by network unit from each particular port are tagged with a port and slot number such that the unit knows which port and particular packet came in on.

FIGS. 1a and 1b illustrate the concept of port-tagging. In the drawing of FIG. 1a there are three units connected together in a network: Unit A, Unit B and Unit C. Port 1 of Unit A is coupled to Port 2 of Unit B and Port 3 of Unit B is coupled to Port 4 of Unit C. Port tagging allows a connectivity chart to be constructed for the network illustrated in FIG. 1a. Specifically, each unit notes on which port each packet is received and where each received packet is from. Using this information, the connectivity chart of FIG. 1b is constructed.

Referring to FIG. 1b, A's connectivity chart notes that packets are received from Unit B through Port 1 and that packets are received from Unit C through Port 1. Similarly, C's connectivity chart notes that packets are received from Unit A through Port 4 and that packets are received from Unit B through Port 4. Note that Unit A and Unit C cannot determine whether their connections to the other units are direct connections since both units A and C received packets from more than one other unit through a single port.

Network Topology Determination

The network topology of FIG. 1a, can easily be determined by examining the connectivity charts in FIG. 1b. Referring again to FIG. 1b, Unit B is connected to Unit A through Port 2 and Unit B is connected to Unit C through Port 3. Since only one unit is connected to each port of Unit B, Unit B can determine the network topology. Specifically, the entire network is described by B's connectivity chart where Port 2 is connected to A and Port 3 is connected to C. Unit B can inform Units A and C about the network topology.

However, only very simple networks can be mapped using this method. In the slightly more complex case of FIG. 1c the network topology cannot be determined by simply looking at a connectivity chart. In FIG. 1c Unit B knows that only Unit A is connected through Port 2 but both Unit C and Unit D are coupled through Port 3. In Unit C, only Unit D connects through Port 5, but both Unit A and Unit B connect though Port 4. Thus, the topology of the network illustrated in FIG. 1c cannot be simply determined using only a connectivity chart built using port tagging.

Automatic Network Topology Mapping

To automatically determine the topology of a computer network, the method of the present invention first identifies the leaf end points of the network. After identifying the leaf end points, the method then proceeds up the network topology successively identifying intermediate levels. Finally a single root is identified and the network topology is fully mapped. If there is more than one possible root device, then one of the possible root devices is arbitrarily selected to be the root device. In the present embodiment, the possible root devices having the lowest Media Access Controller (MAC) address is selected as the root device.

FIG. 2 illustrates a high level flow diagram that describes how the network management modules (NMMs) of the present invention operate to map the network topology. First, at step 210, all network management modules initially start out sending multicast packets to all the other units in the system. The multicast packets are SONMP packets that are defined in U.S. Pat. No. 5,226,120 entitled "Apparatus and Method of Monitoring the Status of a Local Area Network" issued Jul. 6, 1993 and hereby incorporated by reference.

Next, at step 220, each network management module determines if it has any ports that are coupled to only a single unit which is sending out multicast packets. These ports that are coupled to single units that are sending out multicast packets are deemed to be "downstream" links. In the first round, these units are the leaf network management modules that are at the very ends of the network since only units connected to leaf units will detect ports that only have one unit connected. Each unit that identifies a downstream unit alters its network topology table at step 230 such that the single unit is marked as a downstream unit.

Having identified the leaf network management modules, the network management modules above the leaf units send "quench" packets to the leaf network management modules at step 240 to stop the leaf network management modules from transmitting multicast packets. The quench packets are standard ICMP packets that are well known within the Internet Protocol (IP). The step of instructing the lower network management modules to stop sending out multicast packets is known as "quenching". The quenched network management modules identify themselves as being downstream from the network management module that send the quench packet.

At step 250, it is determined whether there are no more units where their relative positions are unknown. At this point there will only be a single network management module sending out multicast packets. When this occurs, the final network management module is determined to be the root and network topology has been fully mapped. However, if there are network management modules that still need to be located within the network topology, then steps 220 through 250 are repeated.

The topology mapping system of the present invention is best explained with reference to a detailed example. Thus, to further explain how the method of present invention operates, the topology mapping of the network of FIG. 3a will be explained in detail. The topology mapping of the network of FIG. 3a will be describe with reference to FIG. 3b, FIG. 3c, and a set of topology tables.

Each network management module in the network maintains its own topology table. The topology table contains entries for every network unit coupled to the network that is seen by the network management module. The topology table entry includes a slot/port address that connects the two units. Each entry also has a status entry that describes how the two network units are related. The following list describes the possible status values that may be stored in the status entry.

| Status | Meaning |
|---|---|
| Self | This is an entry for the NMM unit itself. |
| New | The device on the other end recently sent a multicast packet. |
| Old | The device on the other end had previously sent a multicast packet, but has not sent a multicast packet recently. (It has been squelched.) |
| Down | The device on the other end is an immediate "downstream" neighbor. |
| Up | The device on the other end is an immediate "upstream" neighbor. |

Figure 3A:
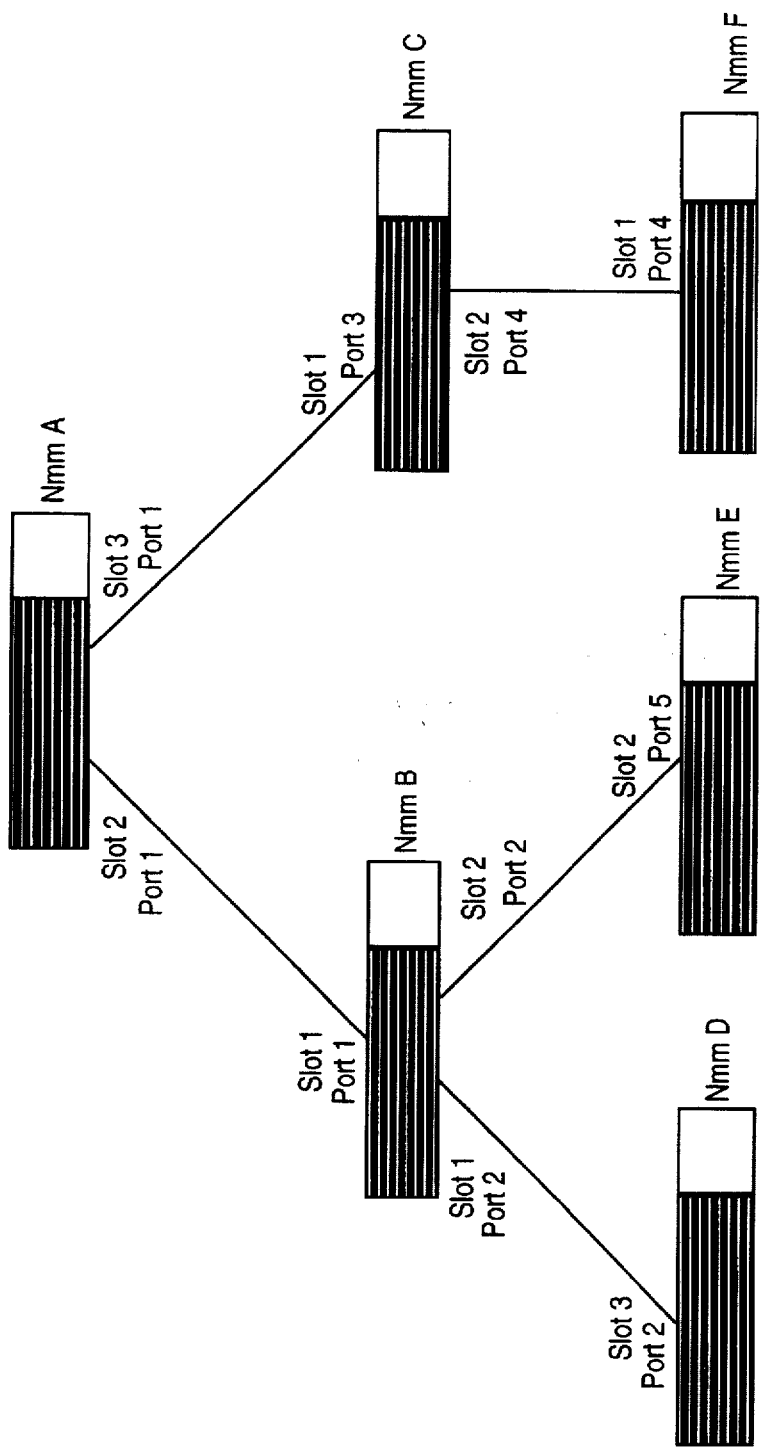
FIG. 3a illustrates an example network that will have its topology mapped using the method of the present invention.

FIG. 3a illustrates a relatively simple network of six network management modules, labeled NMM A through NMM F. In FIG. 3a the slot and port number combinations for each connection is listed on the diagram. (For clarity the slot and port numbers have been omitted from later drawings.) Initially network management modules A through F are all sending out multicast packets which are received by all the other units. This is in accordance with step 210 of FIG. 2.

Every unit in the network receives the multicast packets from every other unit such that each device builds a full topology table listing all the units in the network. Thus the topology tables for the network management modules appear as follows:

TABLE 1

| Slot | Port | Address | Status |
|---|---|---|---|
| NMM A | | | |
| 0 | 0 | NMM A | self |
| 2 | 1 | NMM B | new |
| 2 | 1 | NMM D | new |
| 2 | 1 | NMM F | new |
| 3 | 1 | NMM C | new |
| 3 | 1 | NMM F | new |
| NMM B | | | |
| 0 | 0 | NMM B | self |
| 1 | 1 | NMM A | new |
| 1 | 1 | NMM C | new |
| 1 | 1 | NMM F | new |
| 1 | 2 | NMM D | new |
| 2 | 2 | NMM E | new |
| NMM C | | | |
| 0 | 0 | NMM C | self |
| 1 | 3 | NMM A | new |
| 1 | 3 | NMM B | new |
| 1 | 3 | NMM D | new |
| 1 | 3 | NMM E | new |
| 2 | 4 | NMM F | new |

TABLE 1-continued

| Slot | Port | Address | Status |
|---|---|---|---|
| NMM D | | | |
| 0 | 0 | NMM D | self |
| 3 | 2 | NMM A | new |
| 3 | 2 | NMM B | new |
| 3 | 2 | NMM C | new |
| 3 | 2 | NMM E | new |
| 3 | 2 | NMM F | new |
| NMM E | | | |
| 0 | 0 | NMM E | self |
| 2 | 5 | NMM A | new |
| 2 | 5 | NMM B | new |
| 2 | 5 | NMM C | new |
| 2 | 5 | NMM D | new |
| 2 | 5 | NMM F | new |
| NMM F | | | |
| 0 | 0 | NMM F | self |
| 1 | 4 | NMM A | new |
| 1 | 4 | NMM B | new |
| 1 | 4 | NMM C | new |
| 1 | 4 | NMM D | new |
| 1 | 4 | NMM E | new |

Using the port tagging feature, each network management module assigns a slot/port combination to each entry that identifies the slot/port through which the other unit was detected. For example, in Table 1 the topology table for NMM Unit A indicates that NMM Unit received multicast packets from NMM Units B, D, and E through Slot 2/Port 1. Similarly, the topology table for NMM Unit A indicates that NMM Unit received multicast packets from NMM Units C and F through Slot 3/Port 1.

The status field maintained for each other unit describes the other unit's relationship with the unit keeping the table. If the relation between the two units has not yet been determined the status contains either "new" or "old". A status of "new" indicates that the other unit has recently sent out a multicast packet. A status of "old" indicates that the other unit has not sent out a multicast packet for a predetermined time period. In this situation, the status variable for all the detected units is set to "new" since all the units just recently sent out a multicast packet.

At this point each network management module searches its table for slot/port combinations that only have a single device connected to it with a status of "new" as specified in step 220. For example, network management module B discovers unique slot/port combinations at Slot 1/Port 2 and Slot 2/Port 2. Each unique slot/port combination indicates that another unit is coupled downstream on that slot port combination. In this example, network management module E is connected downstream from Unit B on Slot 1/Port 2 and network management module D is connected downstream from Unit B on Slot 2/Port 2.

Network management module B uses this information to mark the entries in its topology table as specified by step 230. In this example, network management module B marks network management module E and network management module D as downstream links.

Since the relative position of these units has been determined, network management module B sends a quench packet to silence network management modules D and E as specified by step 240. This step is graphically illustrated in FIG. 3b. Upon receiving the quench packet, network management modules D and E mark network management module B as being upstream. Network management modules D and E then cease sending multicast packets and send an acknowledgment packet back to network management module B. To monitor this connection, network management module B will periodically send a quench packet to network management modules D and E that they must respond to.

Figure 3B:
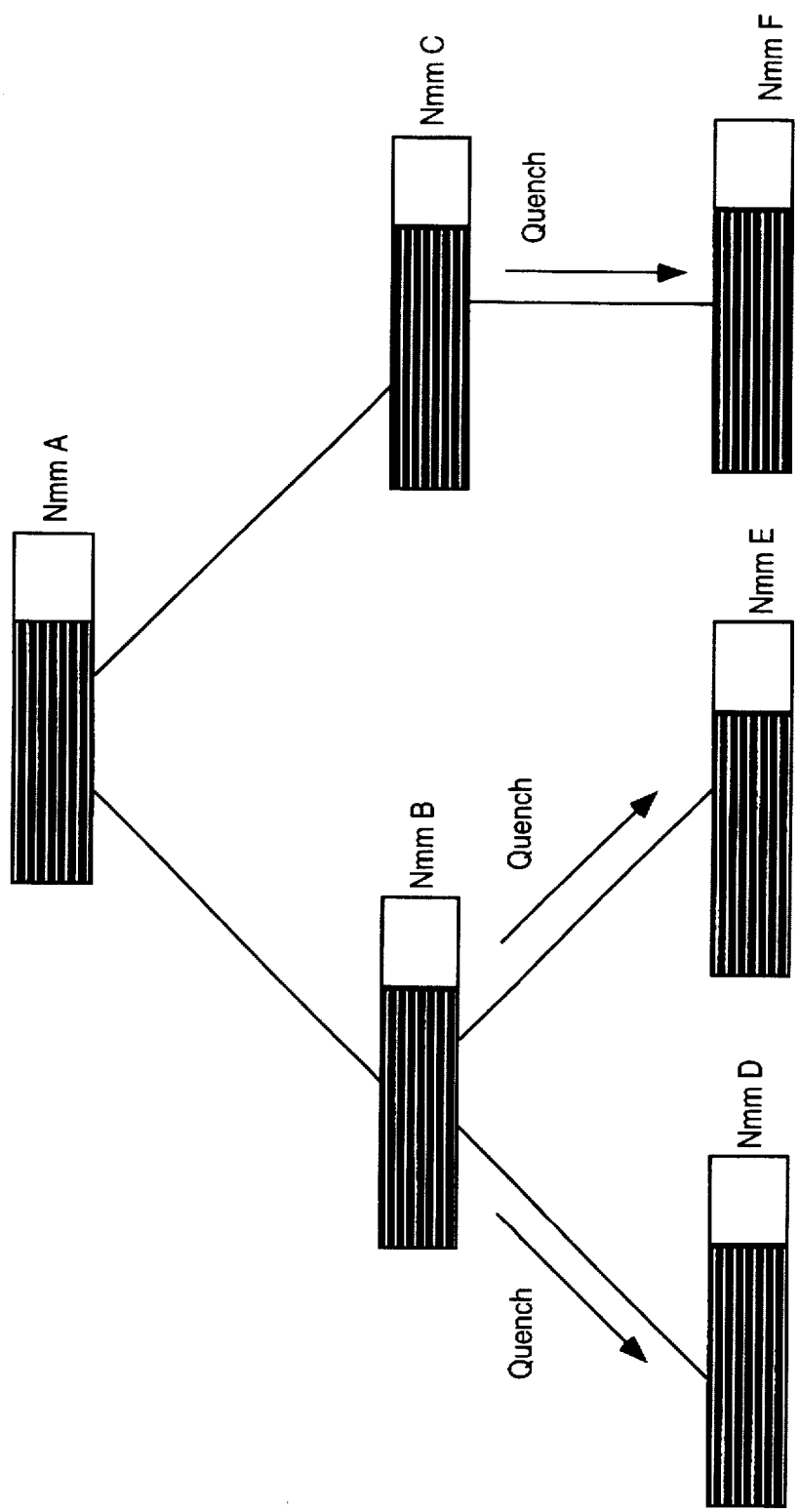
FIG. 3b illustrates the network of FIG. 3a where quench packets have been sent from NMM B to NMM D, from NMM B to NMM E, and from NMM C to NMM F.

In the same fashion network management module C discovers that only network management module F is communicating to it through Slot 2/Port 4. Thus, network management module C marks network management module F as a downstream link through Slot 2/Port 4. Network management module C also sends a packet to network management module F to silence it as illustrated in FIG. 3b. Upon receiving the quench packet, network management module F modifies its topology table to indicate network management module B as being upstream.

After this first round of multicast packet processing has been performed the topology table of each unit will appear as illustrated below.

TABLE 2

| Slot | Port | Address | Status |
|---|---|---|---|
| NMM A | | | |
| 0 | 0 | NMM A | self |
| 2 | 1 | NMM B | new |
| 2 | 1 | NMM D | old |
| 2 | 1 | NMM E | old |
| 3 | 1 | NMM C | new |
| 3 | 1 | NMM F | old |
| NMM B | | | |
| 0 | 0 | NMM B | self |
| 1 | 1 | NMM A | new |
| 1 | 1 | NMM C | new |
| 1 | 1 | NMM F | old |
| 1 | 2 | NMM D | Down |
| 2 | 2 | NMM F | Down |
| NMM C | | | |
| 0 | 0 | NMM C | self |
| 1 | 3 | NMM A | new |
| 1 | 3 | NMM B | new |
| 1 | 3 | NMM D | old |
| 1 | 3 | NMM E | old |
| 2 | 4 | NMM F | Down |
| NMM D | | | |
| 0 | 0 | NMM D | self |
| 3 | 2 | NMM A | new |
| 3 | 2 | NMM B | Up |
| 3 | 2 | NMM C | new |
| 3 | 2 | NMM E | old |
| 3 | 2 | NMM F | old |
| NMM E | | | |
| 0 | 0 | NMM E | self |
| 2 | 5 | NMM A | new |
| 2 | 5 | NMM B | Up |
| 2 | 5 | NMM C | new |
| 2 | 5 | NMM D | old |
| 2 | 5 | NMM F | old |
| NMM F | | | |
| 0 | 0 | NMM F | self |
| 1 | 4 | NMM A | new |
| 1 | 4 | NMM B | new |
| 1 | 4 | NMM C | Up |
| 1 | 4 | NMM D | old |
| 1 | 4 | NMM F | old |

Referring to Table 2, in network management module A's topology table, network management modules D,E and F are all marked as "old". These network management modules have been marked as old since they have not recently sent out a multicast packet. However, network management module A has not determined the location of any other units, so the remainder of the units are marked as new.

Network management module B's topology table has become a bit more completed. Network management module B has determined that network management module D and E are both downstream from it. Furthermore, in network management module B's topology table network management module F now has the status of "old" since it is no longer sending out multicast packets. Network management module A and network management module C are still labeled as "new" since they have recently sent out multicast packets.

Network management module C has made similar changes in its network topology table. Network management module C is determined that network management module F is downstream. It has also noticed that network management modules D and E are no longer transmitting multicast packets such that their status is set to "old".

Network management modules D and E have both received quench packets from network management module B. They have therefore marked network management module B in their topology tables as being upstream. Similarly network management module F received a quench packet from network management module C and therefore marked network management module C being upstream.

In the next round only network management module A is able to find a slot/port combination with a single "new" unit connected to it. (It actually finds 2). After one more round of multicast work, each the topology Maps for each unit will be as illustrated in the following table.

TABLE 3

| Slot | Port | Address | Status |
|---|---|---|---|
| NMM A | | | |
| 0 | 0 | NMM A | self |
| 2 | 1 | NMM B | Down |
| 2 | 1 | NMM D | Old |
| 2 | 1 | NMM E | Old |
| 3 | 1 | NMM C | Down |
| 3 | 1 | NMM F | Old |
| NMM B | | | |
| 0 | 0 | NMM B | self |
| 1 | 1 | NMM A | Up |
| 1 | 1 | NMM C | Old |
| 1 | 1 | NMM F | Old |
| 1 | 2 | NMM D | Down |
| 2 | 2 | NMM E | Down |
| NMM C | | | |
| 0 | 0 | NMM C | self |
| 1 | 3 | NMM A | Up |
| 1 | 3 | NMM B | Old |
| 1 | 3 | NMM D | Old |
| 1 | 3 | NMM E | Old |
| 2 | 4 | NMM F | Down |
| NMM D | | | |
| 0 | 0 | NMM D | self |
| 3 | 2 | NMM A | Old |
| 3 | 2 | NMM B | Up |
| 3 | 2 | NMM C | Old |
| 3 | 2 | NMM E | Old |
| 3 | 2 | NMM F | Old |
| NMM E | | | |
| 0 | 0 | NMM E | self |
| 2 | 5 | NMM A | Old |
| 2 | 5 | NMM B | Up |

TABLE 3-continued

| Slot | Port | Address | Status |
| --- | --- | --- | --- |
| 2 | 5 | NMM C | Old |
| 2 | 5 | NMM D | Old |
| 2 | 5 | NMM F | Old |
| NMM F | | | |
| 0 | 0 | NMM F | self |
| 1 | 4 | NMM A | Old |
| 1 | 4 | NMM B | Old |
| 1 | 4 | NMM C | Up |
| 1 | 4 | NMM D | Old |
| 1 | 4 | NMM E | Old |

Figure 3C:
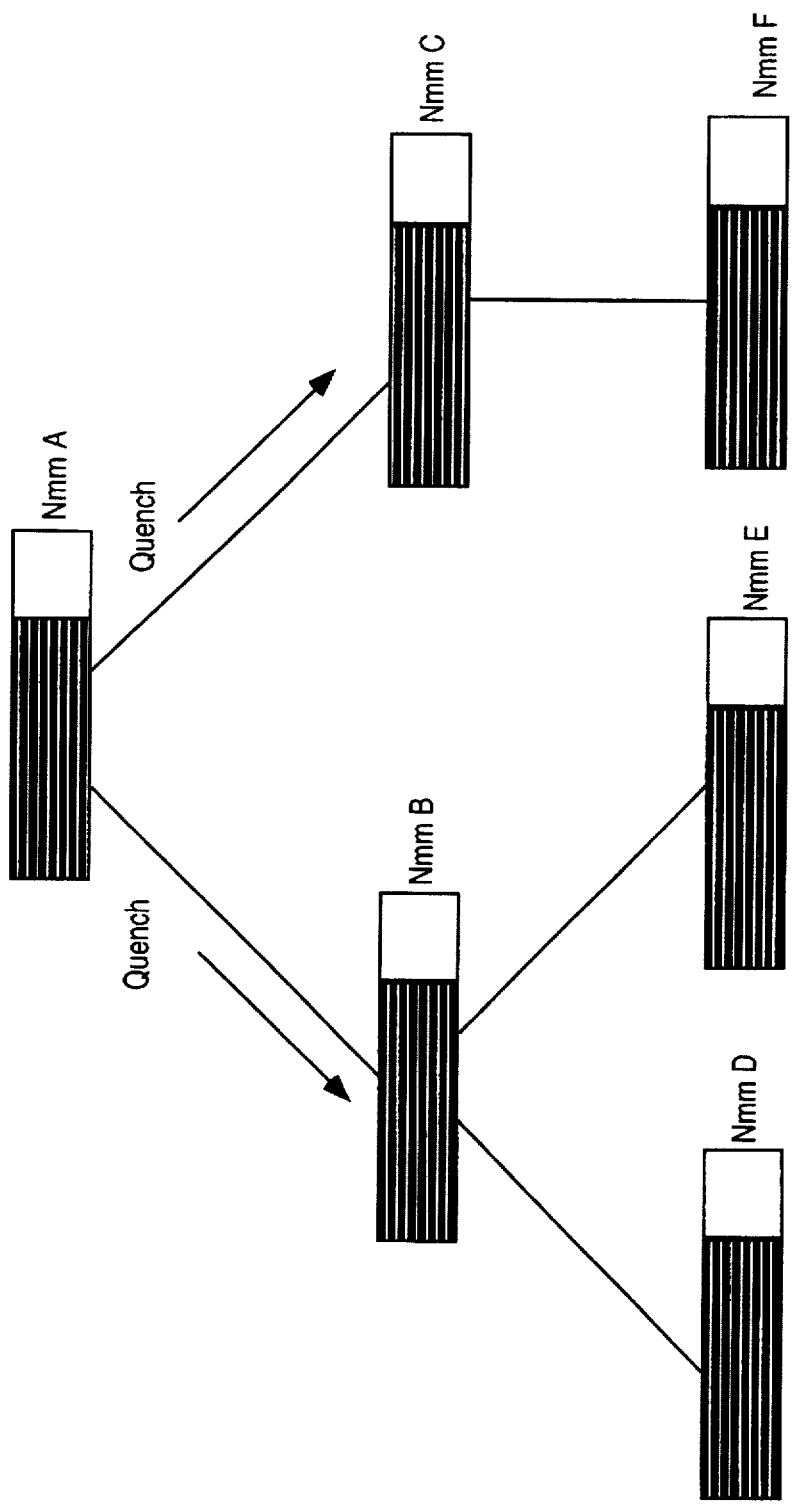
FIG. 3c illustrates the network of FIG. 3a where quench packets have been sent from NMM A to NMM B and NMM C.

Network management module A detected network management module B connected to Slot 2/Port 1 and network management module C connected to Slot 3/Port 1. Network management module A therefore marks network management modules B and C in its topology map as being downstream units. Next, network management module A sends quench packets to network management modules B and C as illustrated in FIG. 3c. After receiving the quench packets, network management module B and C cease to generate multicast packets and mark network management module A as being a upstream neighbor in their respective topology maps.

At this point, the whole network topology has been mapped. The only network management module that is still sending multicast packets is network management module A. After determining that there are no new network management modules that have any undefined locations network management module A ceases multicasting.

At this point the entire network system has reached a steady state and all of the relative nearest neighbors positions have been determined. In the steady state condition all the units which are upstream from other downstream units must continue to watch the connection to the downstream units. Specifically, all of the upstream network management modules periodically send quench packets to the downstream units.

To build an overall topology map, all the network management modules just share information in their topology maps. Specifically, each network management module knows its connections to its nearest neighbors. By sharing all these connections, an overall topology map can be built.

The method as previously described was implemented in one embodiment using two execution threads in each network management module: a sending thread and a receiving thread. The sending thread is responsible for sending out multicast and unicast packets as required. The receiving thread receives packets and appropriate adjusts the topology table The receiving thread must also respond to several different types of timers.

The Sending Thread

The sending thread must send out the packets that are necessary for determining the topology of a network. Initially, it sends out multicast packets to all the other devices on the network. When lower neighboring device is detected, the sending thread sends quench packets to that lower neighboring device. When the device is quenched or steady state is reached, the sending thread ceases to send out multicast packets.

Figure 4A:
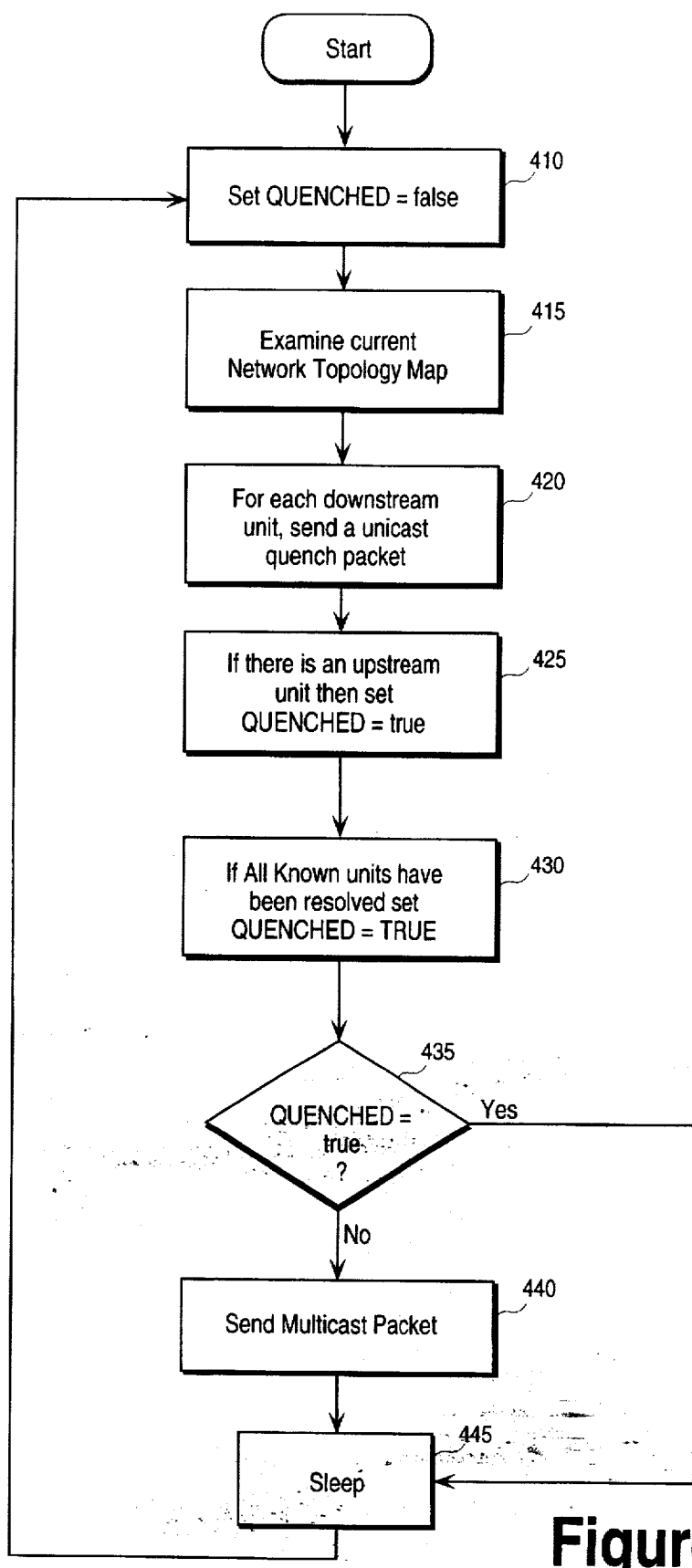
FIGS. 4a–4d illustrate a flow diagram of a packet sender thread that implements a portion of the present invention.

FIG. 4a illustrates a flow diagram for the sending thread. Initially, the sending thread sets a boolean QUENCHED variable to "false" at step 410. The boolean QUENCHED variable indicates whether this device has been quenched by an upstream unit. Then, at step 415, the sending thread examines the topology map that the device has built at the current time.

For each downstream device that is detected in the topology table, the device sends out a unicast quench packet as listed in step 420. If an upstream device is detected, then the boolean QUENCHED variable is to "true" at step 425 since there is an upstream device that is quenching this device. Finally, if all the known devices in the network have been resolved, then the boolean QUENCHED variable is to "true" at step 430 since this device must be root device of the network.

At step 435, the boolean QUENCHED variable is tested. If the device has not been quenched by an upstream device, then the device sends out a multicast packet to all the other devices that it knows of. If the device has been quenched, then the device does not send out a multicast packet and instead proceeds directly to sleep step 445. Sleep step 445 puts the sending thread to sleep for a short amount of time. In one embodiment, the sleep step puts the thread to sleep for a random amount of time thereby enhancing system behavior under imperfect network conditions.

The Receiving Thread

Figure 4B:
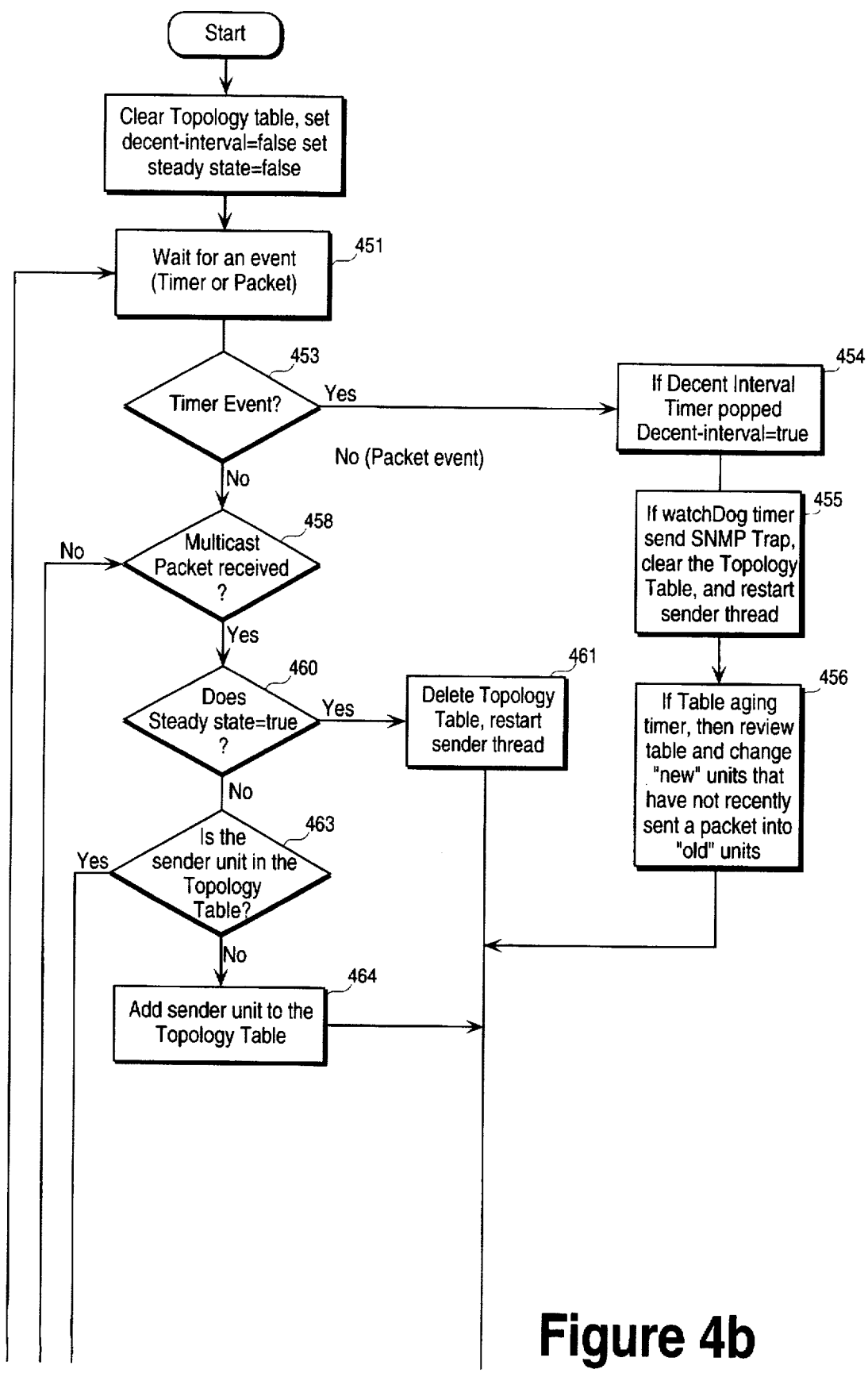
Figure 4C:
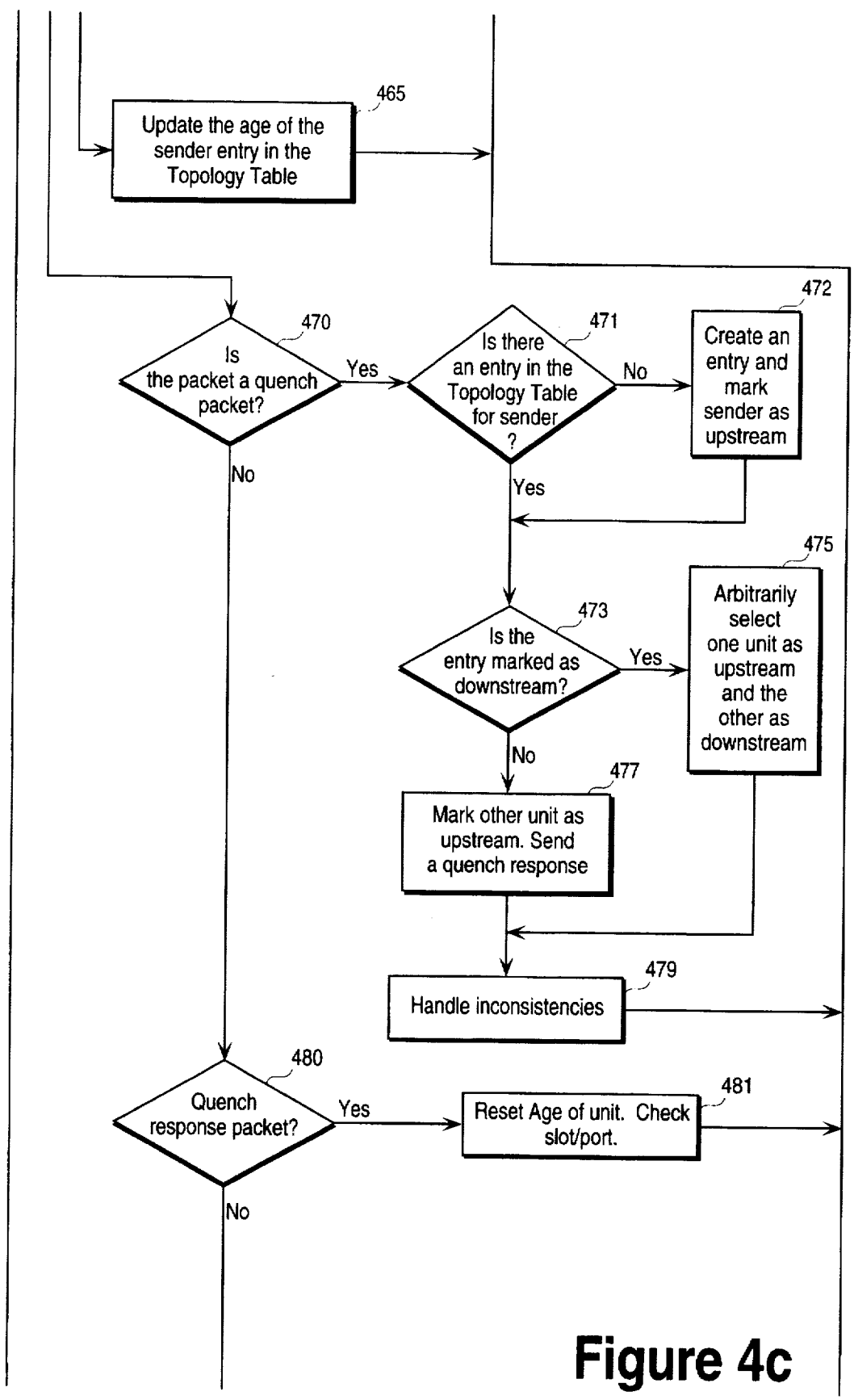
Figure 4D:
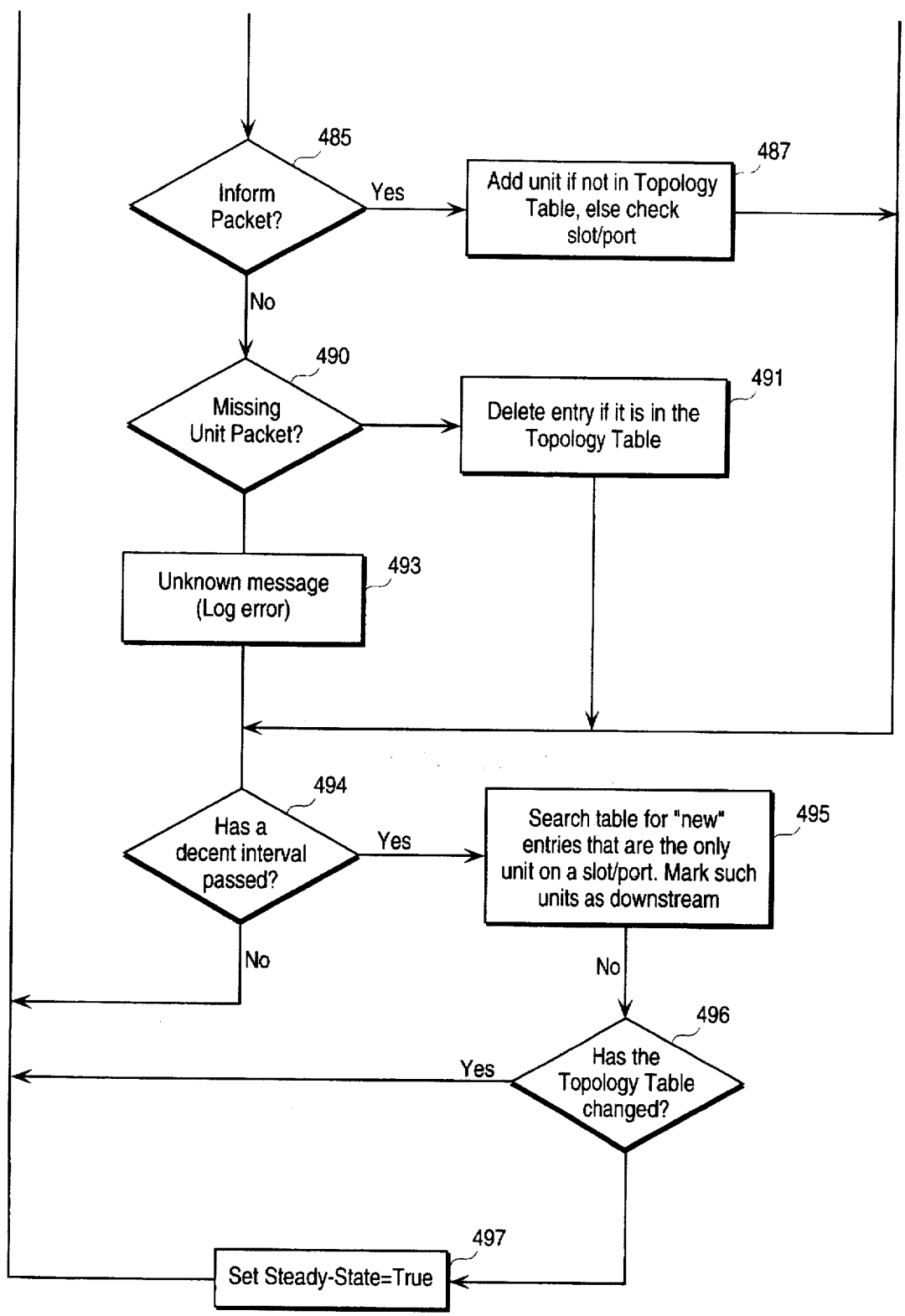

The receiving thread performs the majority of the work involved in building a topology map. Initially, the receiving thread starts with an empty topology table. The receiving thread then receives incoming packets and modifies the topology table according to information obtained from the incoming packets. The receiving thread also responds to timer time-out event. FIG. 4b illustrates a flow diagram of one possible embodiment of the receiving thread. However, the concepts of the present invention can be implemented in many different manners in many different computer programs.

FIG. 4b illustrates a flow diagram for the receiving thread. Initially, the receiving thread sets boolean STEADY-STATE and DECENT-INTERVAL variables to "false" at step 450. The boolean STEADY-STATE variable indicates whether this device has reached a steady-state where it believes that it has mapped out the network topology. The boolean DECENT-INTERVAL variable indicates whether this device has waited a decent interval to learn of all the other devices on the network before attempting to refine the topology map. Also at step 450, the receiving thread empties the topology map.

At step 451, the receiving thread waits for an event to occur. The event may be a received packet or a timer that has timed-out. At step 453 the receiving thread detects if it is a timer event. If it is a timer event, it will be processed in step 454, step 455, or step 456. At step 454, the receiving thread determines if the decent interval timer popped and if it did, the boolean DECENT-INTERVAL variable is to "true."

At step 455, the receiving thread determines if the watchdog timer popped. The watchdog timer is used to ensure that a device is still connected to an upstream device. The watchdog timer is reset every time the upstream sends a quench packet. If the upstream device stops sending quench packets, then the watchdog timer will time-out. When this occurs, the receiving thread clears the topology table, sets the DECENT-INTERVAL variable is to "false", and restarts the sender thread such that the network topology will be rebuilt.

At step 456, the receiving thread determines if the table-aging timer popped. The table-aging timer is used to determine if any other units that were defined as "new" have not sent a recent packet such that their status should change to "old". Thus, the receiving thread goes through the entire topology table and changes "new" devices into "old" devices if they have not sent a packet recently. After the timer event has been processed, the receiving thread proceeds to step 494 that will be described later.

If the event that was detected was not a timer event (as determined at step 453, then a packet must have been received. The receiving thread performs different actions depending upon what type of packet was received.

Step 458 determines if a multicast packet was received. Multicast packets are usually only sent when the topology of the network is initially being determined. When a multicast packet is received, the receiving thread tests the STEADY-STATE variable at step 460 to determine if it is in steady-state. If a multicast packet is received when in steady-state, then a new device was probably added to the network. To determine where the new device fits within the network, the entire topology is remapped. Thus, at step 461 the receiving thread clears the topology table, sets the DECENT-INTERVAL variable is to "false", and restarts the sender thread such that the network topology will be rebuilt.

When a multicast packet is received when the device is not in a steady state, then the multicast packet is used to update the topology table. At step 463, the receiving thread determines if the multicast packet was received from a unit that is already in the topology table. If the unit was not in the topology table, then it is added to the topology table at step 464. If there is already an entry for the unit that sent the packet, then the age of that entry is updated at step 465.

Several different types of unicast packets are also responded to. Step 470 determines if a quench packet was received. Steps 417 to 479 process a received quench packet. The first test of a quench packet is done at step 471 which determines if the quench packet was received from a device that is listed in the topology table. If the device that sent the quench packet was not in the topology table, then the device is added to the topology table at step 472 and marked as an upstream (or parent) device relative to the current device.

At step 473, the receiving thread checks to see if the device that sent the quench packet is marked as a downstream device. This seemingly anomalous situation can occur when their are two possible devices that may be the root device. To resolve this situation, one of the device is selected as the upstream device and the other device is correspondingly selected as the downstream device at step 475. In one embodiment, the address of the media access controller (MAC address) is examined for both devices and the device with the lower MAC address is selected as the upstream device.

If the other device was not detected to be a downstream device at step 473, then it is marked as a upstream device at step 477. Finally, step 479 handles any other inconsistencies that may have been detected. For example, the quench packet may have been received from a upstream device, but on a unexpected slot/port combination. This situation is handled by changing the slot/port address of the upstream device.

Step 480 determines if a quench response packet has been received. When a quench response packet is received, the age of that downstream device is reset at step 481. Furthermore, any inconsistencies, such as an incorrect slot/port combination, are also resolved at step 481

Step 485 determines if an inform packet has been received. When an inform packet is received, the receiver thread uses the information to refine its topology table at step 487. For example, if the inform packet is from a new unit, then that unit is added to the topology table.

Step 490 determines if a missing unit packet has been received. When a missing unit packet is received, the receiver thread uses the information to refine its topology table at step 491. Specifically, the receiving thread removes the missing unit from the topology table.

Any other packet received is unrecognized and not acted upon. In some embodiments, an error may be noted in a log as stated in step 493.

After processing the event, step 494 determines if a decent interval has passed. This is done by checking if DECENT-INTERVAL=true. If a decent interval has not passed, then the receiving thread returns to step 451 and waits for another event to occur.

If a decent interval has passed, then the receiving thread examines the current topology table at step 495 to see if any refinements can be made. Specifically, the receiving thread searches for "new" devices that are the only device on a particular slot/port combination. If such a device is detected, it is marked as downstream. At step 496, the receiving thread checks whether the topology table changed at all. If it did change, then the receiving thread returns to step 451 and waits for another event to occur. If it did change, then the receiving thread enters steady-state and sets STEADY-STATE to "true" at step 497 and then returns to step 451 and waits for another event to occur.

There are many interesting situations that the method of the present invention must be able handle properly. Several of these situations are listed in the sections that follow.

Moving A Device To Another Port

Figure 5:
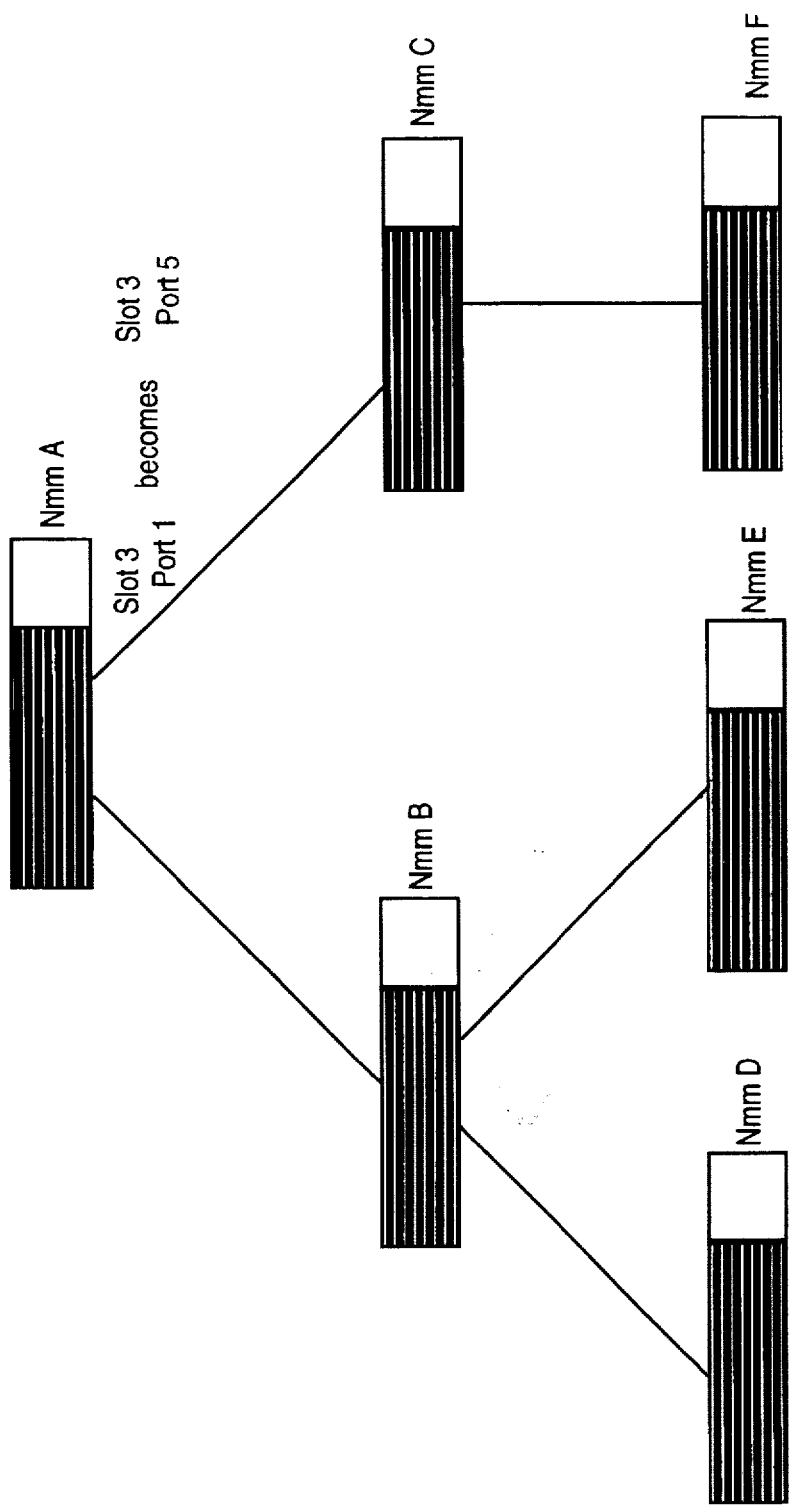
FIG. 5 illustrates the network of FIG. 3a where the slot/port location of one unit is changed.

The method of the present invention must be able to detect when a network management module is moved from one slot/port combination to another slot/port combination. FIG. 5 illustrates such a situation where network management module C is moved from Slot 3/Port 1 of network management module A to Slot 3/Port 5 of network management module A.

Since network management module A is upstream from network management module C, it is responsible for overseeing the connection between it and network management module C. Network management module A performs this task by periodically sending quench packets to network management module C. In response to the quench packets, network management module C must send an acknowledgment back to network management module A to verify that the connection is still active.

In this situation, the quench packet will be received by network management module C at the new location and network management module C will send back a response. In the response sent by network management module C the port tagging of network management module A will indicate that network management module C has moved from Slot 3/Port 1 of network management module A to Slot/3 Port 5 of network management module A. Network management module A will update this change of position in its topology table. To notify other units on the network, network management module A generates a Simple Network Management Protocol (SNMP) trap that informs other units on the network of the change.

Adding A New Device To A Network

Figure 6:
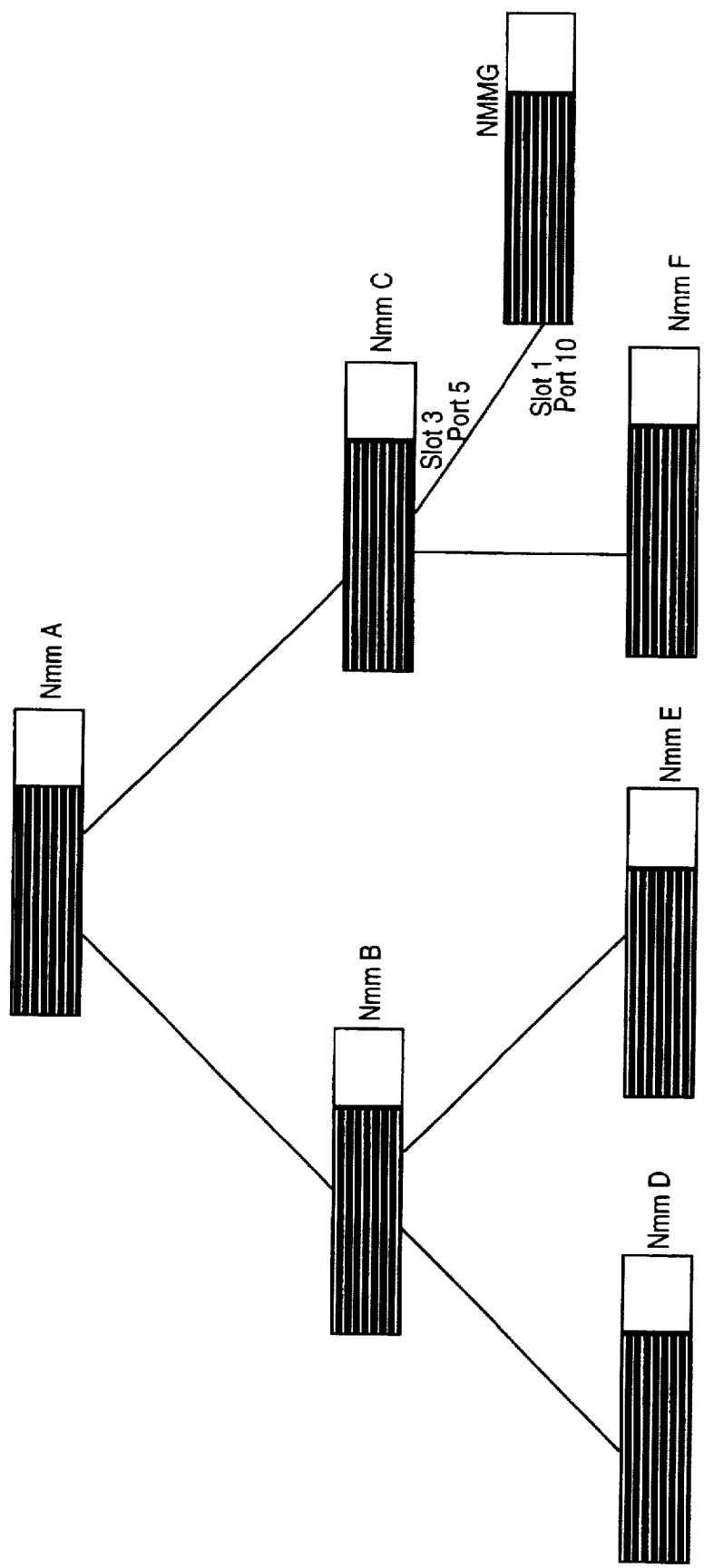
FIG. 6 illustrates the network of FIG. 3a where a new unit has been added to the network.

The method of the present invention needs to be able to detect when a new network management module is added to the network. To illustrate this situation, FIG. 6 depicts the network example of FIG. 3a with a new network management module added to the network. Specifically, network management module G has been added to Slot 3/Port 5 of network management module C.

When network management module G in FIG. 6 powers up it begins broadcasting multicast packets to all the other units connected to the network. Every network management module that receives the multicast packets will notice that network management module G to their topology table. This situation will be handled by step 461 of the receiving thread. Step 461 of the receiving thread clears the topology table, sets the DECENT-INTERVAL variable is to "false", and restarts the sender thread such that the network topology will be rebuilt.

Eventually, network management module C will notice that network management module G is an only "new" unit connected to network management module C's Slot 3/Port 5. Therefore, network management module C marks network management module G as being a downstream link in its topology map. Furthermore, network management module C sends a quench package to silence network management module G. After receiving the quench packet network management module G will cease to send out multicast packets. Network management module G will also mark network management module C in its topology table as being an upstream link on Slot 1/Port 10.

Deleting A Device From A Network

Figure 7:
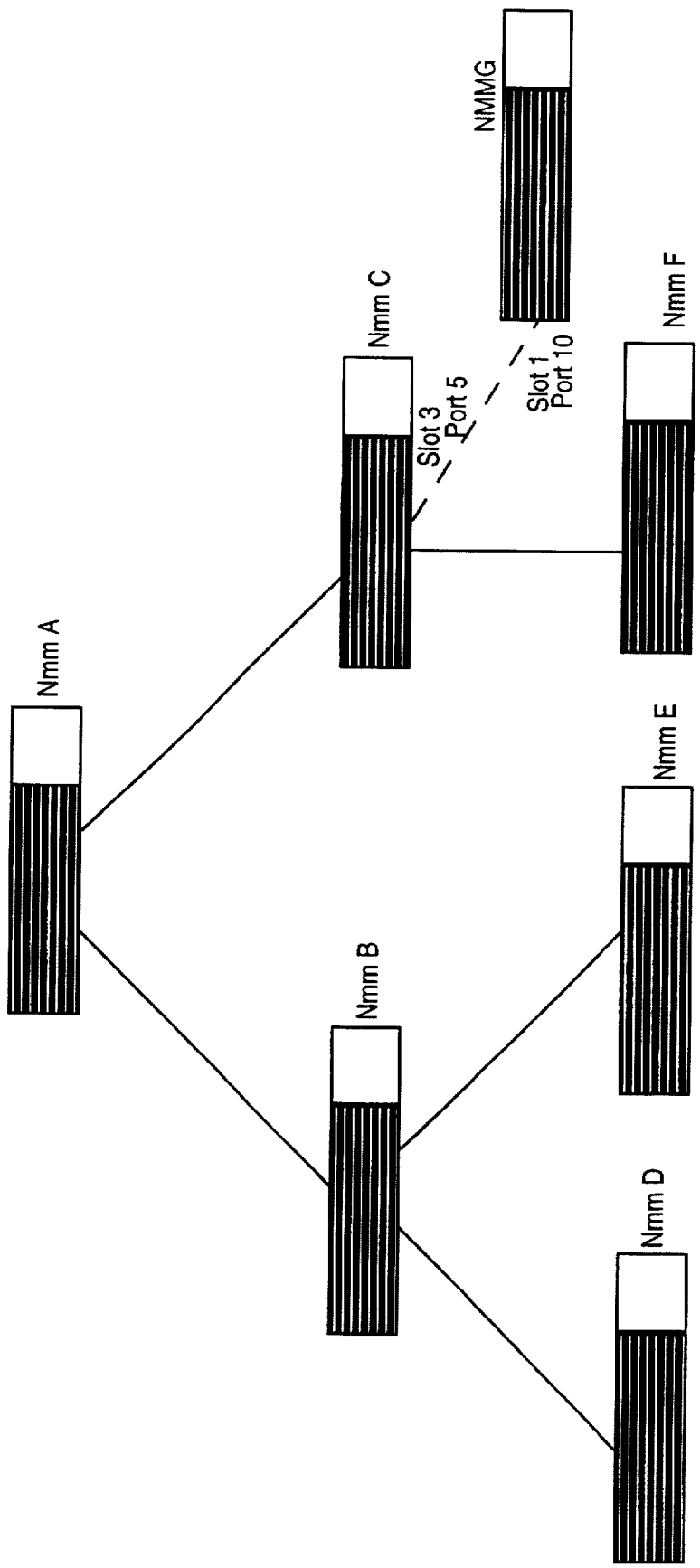
FIG. 7 illustrates the network of FIG. 6 where the newly added unit is then removed from the network.

FIG. 7 illustrates the same network as FIG. 6 except that the link between network management module C and network management module G has been removed. This can be caused by two different situations. First, network management module G might be powered-off or crashed. Alternatively, the link between network management module C and network management module G may temporarily be down. Each of these two situations will be described.

In the case where network management module G has been powered-off, then network management module G will no longer respond to the quench packets periodically sent by network management module C. Since network management module C is no longer receiving response from its quench packets, network management module C will remove network management module G from its topology map. Network management module C also generates a Simple Network Management Protocol (SNMP) trap that will inform others of the topology change. The other network management modules will use the information in the trap to remove network management module G from their topology tables.

In the other case where the link between network management module C and network management module G is temporarily down, a different set of events will occur. First of all, network management module G will miss the quench packets from network management module C. After not seeing a quench packet for a sufficiently long amount of time, network management module G will start to broadcast multicast packets again. It will also delete its topology table so that it will need to rebuild a topology table.

If the link between network management module C and network management module G remains down for a significant period of time then the set of events outlined in the previous paragraph will occur. Specifically, network management module C will remove network management module G from the its topology table and generate an SNMP trap that will inform others that network management module G is gone. However, if the link is brought back up then all the other units will begin to receive network management module G's multicast packets. The situation will therefore become that of FIG. 6 where network management module G has just been added to the network topology. Thus network management module G will be added to the topology as a new unit.

Moving A Device In A Network

Figure 8:
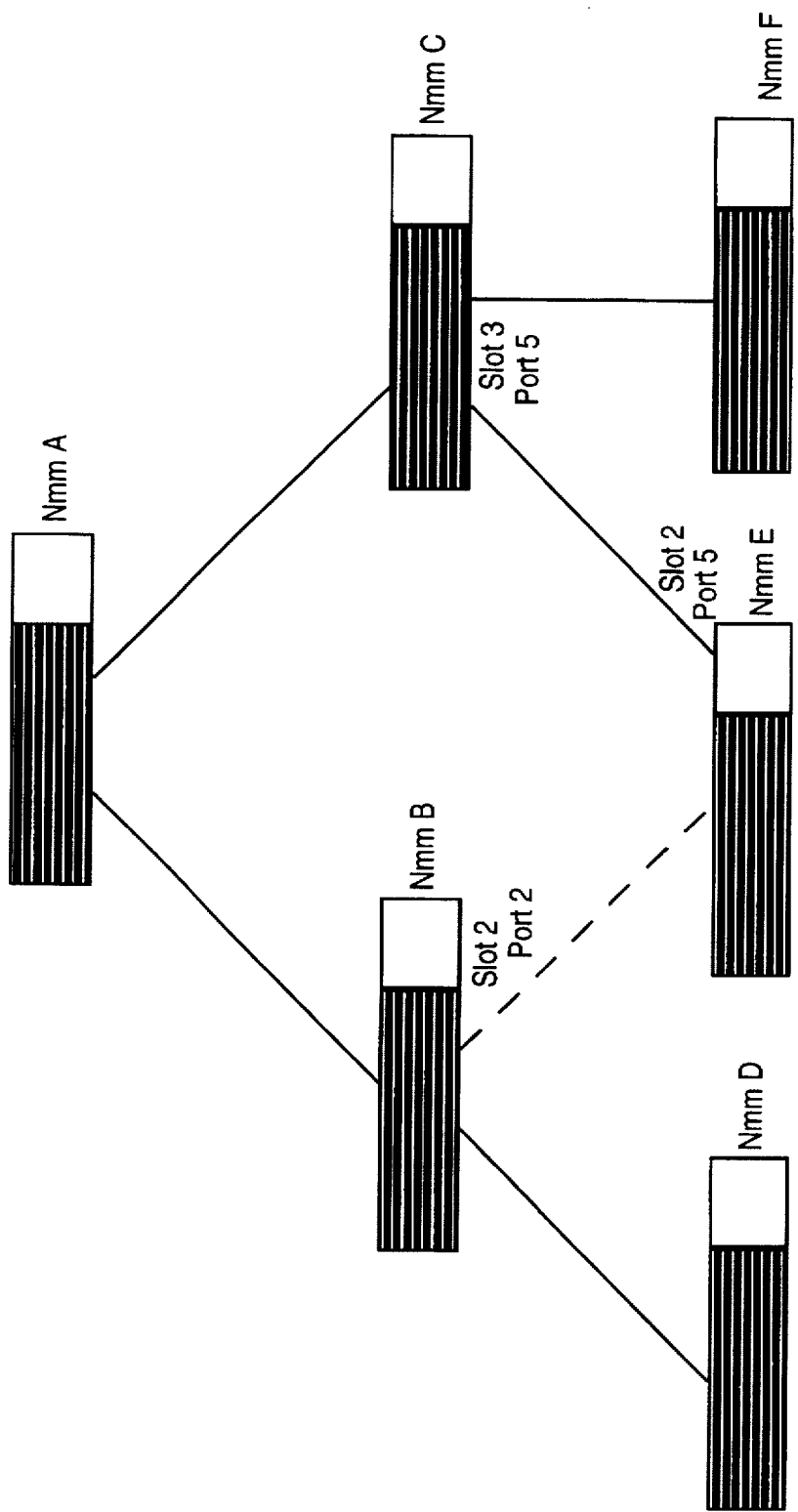
FIG. 8 illustrates the network of FIG. 3a where one unit is moved from one location to another location.

FIG. 8 illustrates a complex situation where a network management module has been moved from being connected downstream from one network management module to being connected downstream from another network management module. Specifically network management module E has been moved from being downstream from network management module B to being downstream from network management module C. There are three possible ways that this may occur. First the unit may be powered down, removed from the network and then later reconnected and re-powered up in the new location. Second the device can be reconnected to a different network management module without being powered down and without any quench packets being missed. Third the device may be reconnected without being powered down but enough quench packets are missed such that it appears as if the device was removed from the network. Each possible scenario will be described below.

If the network management module is powered down and removed from the network and later reconnected and re-powered in a different location, then the situation can be handled with as previously described. Specifically, when the network management module is powered down and disconnected, it will be treated as a network management module that has been removed from the network as described with reference to FIG. 7. Later, when the network management module is reconnected to the network and restarted, the situation can be described as a new network management module being added to the network as previously described with reference to FIG. 6.

In the second scenario the network management module is disconnected from one network management module and quickly reconnected to another network management module without being powered down and without missing a quench packet. As illustrated in FIG. 8 network management module E moves from Slot 2/Port 2 of network management module B to Slot 3/Port 5 of network management module C.

From network management module B's perspective, network management module E will appear to move from Slot 2/Port 2 to Slot 1/Port 1. Since of network management module B already knows that it has neighbors on Slot 1/Port 1, it will therefore mark the entry as old. By switching network management module E from a downstream link to an upstream link, network management module B will no longer quench network management module E.

Since network management module E will no longer be receiving quench packets, network management module E eventually takes itself out of the steady state and begins to send out multicast packets to all the devices on the network. Network management module E also deletes its topology table in order to rebuild a new topology table. The other network management modules in the network will respond to the multicast packets as if it were a new device connected to the network and thus rebuild their topology tables as previously described with reference to FIG. 6. Steady state is achieved shortly.

The third and final scenario is where network management module E is moved from network management module B to network management module C without poring down, but several quench packets are missed. Since several quench packets are missed, management module E will appear to have been removed from the network. Thus, in this situation the device will again appear as if it were powered down, removed from the network, reconnected to the network with a connection to different network management module, and powered back up. Thus, in the third situation it will be treated as a deleted from the network as explained with reference to FIG. 7 and then added back on to the network as explained with reference to FIG. 6.

A Network With Units That Do Not Respond To Proprietary Protocol

In a network not all of the devices on the network may cooperate in the automatic topology mapping system of the present invention. In such a situation, the devices that do not cooperate are referred to as "black boxes."

Figure 9:
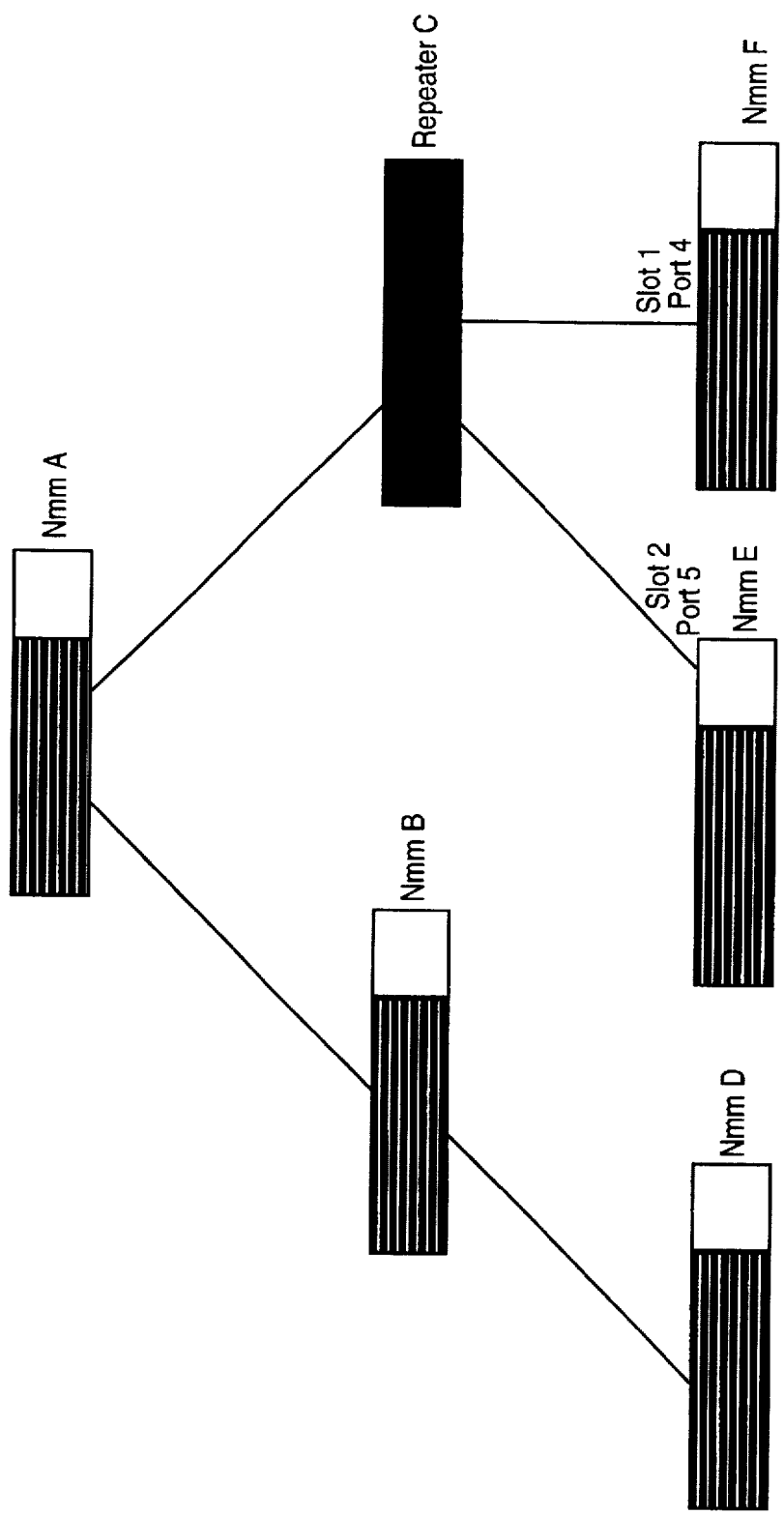
FIG. 9 illustrates the network of FIG. 3a where one unit is a "black box" unit that does not participate in the automatic topology method.

FIG. 9 illustrates a situation where repeater C is replaced between network management module A and network management module E and F. Repeater C does not participate in the automatic topology mapping system of the present invention such that the position of network management module E and network management module F cannot be adequately determined. The reason for this is that network management module A will never see network management modules E and F as being quenched.

To deal with such a situation, different techniques can be used. One simple technique would simply be to ignore such cases. In this case, network management modules B and D will continue to show network management modules A, E and F as "new". Thus the topology would not be fully mapped.

A more advanced technique would be to have network management modules A, E and F to arbitrarily quench each other using some fixed rule. For example, after a set period of time where these devices cannot seem to determine their relative positions, the devices would then arbitrarily stop sending out multicast packets.

A Bridged Computer Network

Figure 10:
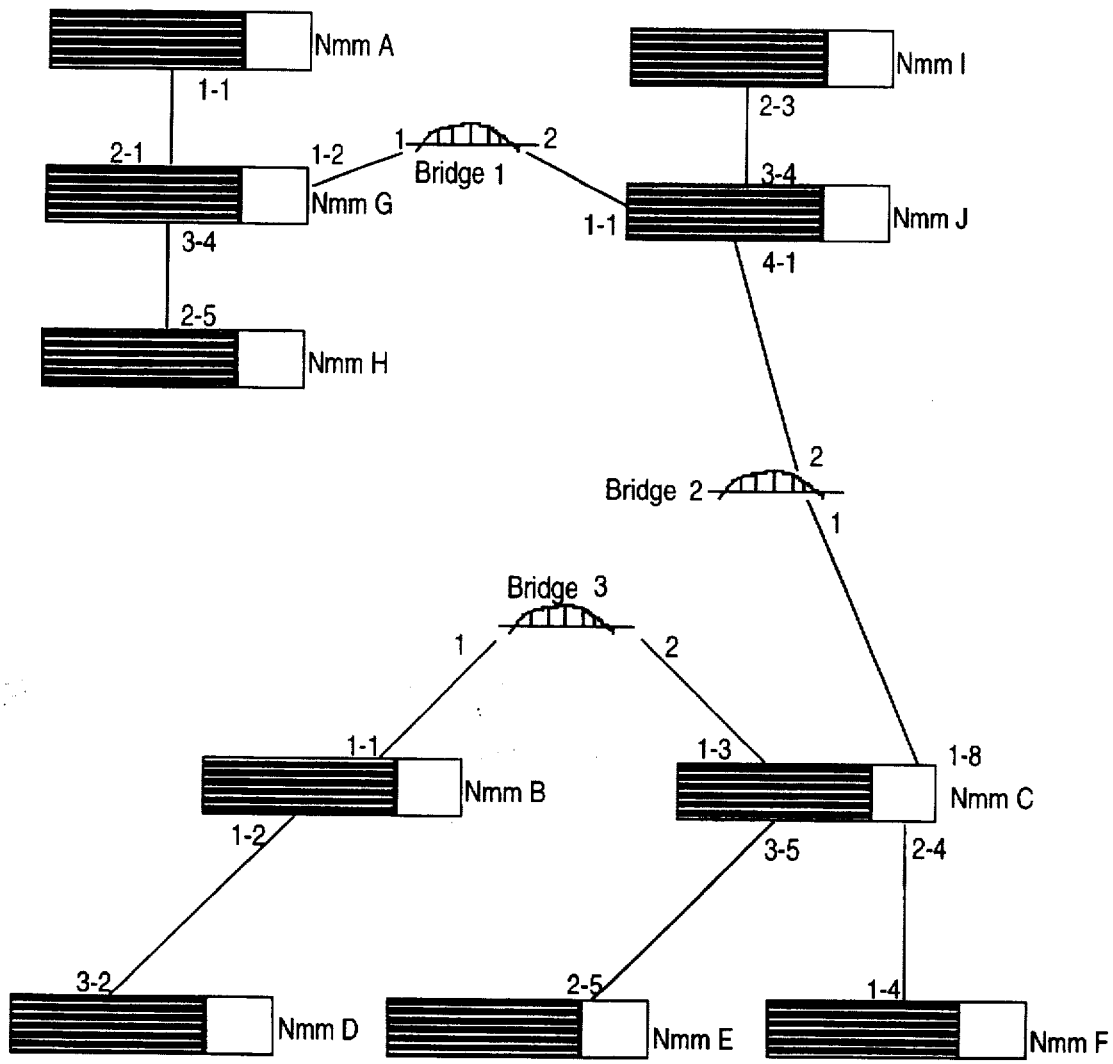
FIG. 10 illustrates a complex computer inter-network wherein three network bridges to connect three separate computer networks.

FIG. 10 illustrates a complex computer network wherein ten different network management modules are coupled together into a larger internetwork that uses three different bridges to connect three separate computer networks. To use the present invention in the environment of FIG. 10, not much modification is required.

In the network of FIG. 10 there are two different types of multicast packets that are sent out: local multicast packets within a network and flatnet multicast packets that are sent throughout the entire internetwork. Both types of multicast packets contain the same information and can be used interchangeably. Both types of multicast packets will be quenched by a single quench packet. The additional segment packet data unit PDU is used to mark a network management module as being local to the segment.

Figure 11:
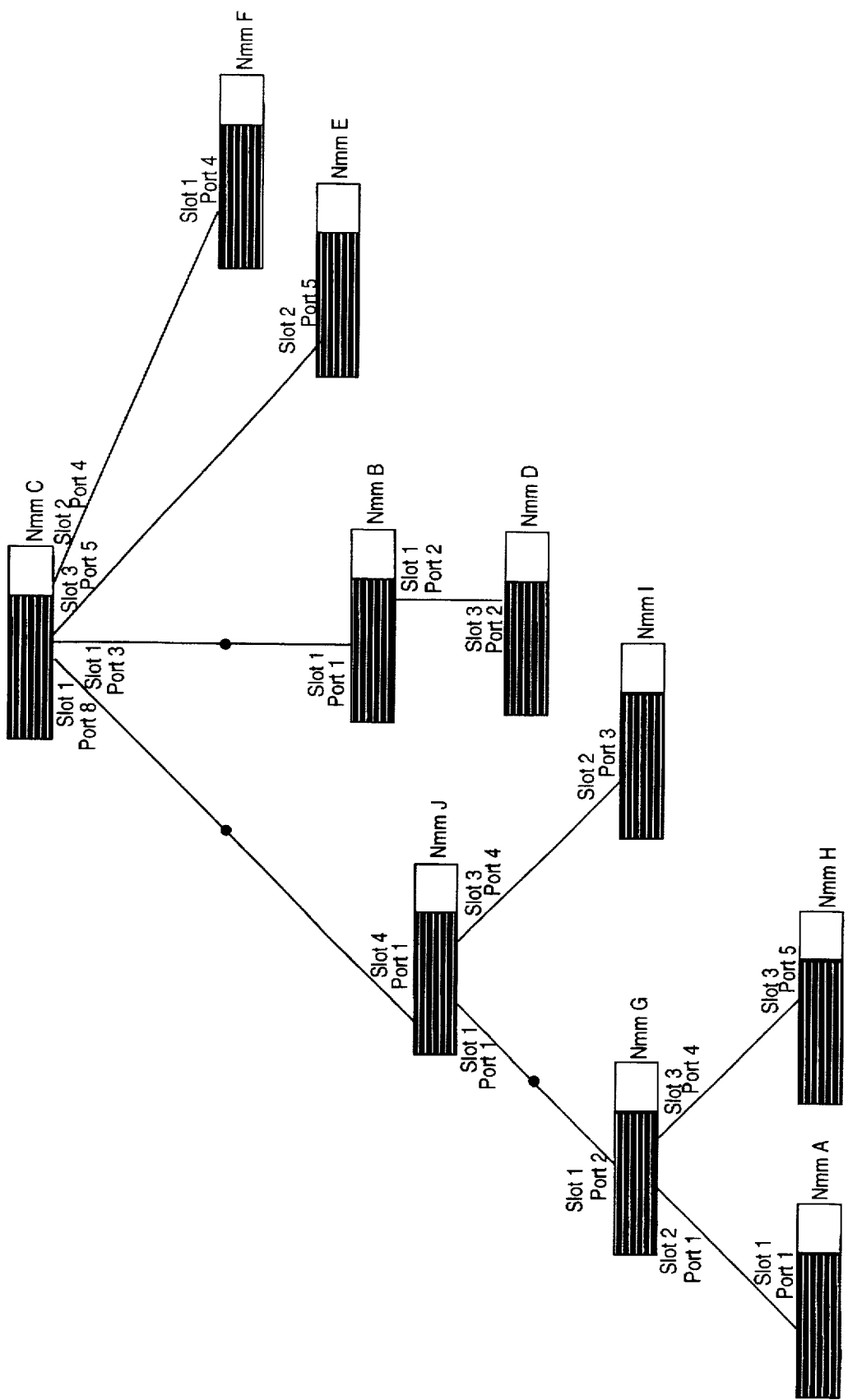
FIG. 11 illustrates the complex computer internetwork of FIG. 10 after it has been mapped out using the method of the present invention.

The network of FIG. 10 will have its topology automatically mapped using the present invention as follows. In the first round, network management module G will quench network management modules A and H, network management module J will quench network management module I, network management module C will quench network management modules E and F, and network management module B will quench network management module D. In the second round network management module C will quench network management module B and network management module J will quench network management module G. Finally, network management module C will quench network management module J or network management module J will quench network management module C, depending upon the timing of the system. After the automatic topology mapping system has been applied, the topology of the network will be mapped out as illustrated in FIG. 11.

The foregoing has described a method for automatically determining the topology of a computer network. It is contemplated that changes and modifications may be made by one of ordinary skill in the art, to the materials and arrangements of elements of the present invention without departing from the scope of the invention.

We claim:

1. A computer implemented method of automatically determining the topology of a computer network, said computer network comprising a plurality of network devices coupled together, each of said network devices having at least one port, said method comprising starting with a set of all network devices then repeating the following steps until all network devices downstream from other network devices are detected:

sending packets from each of said network devices in said set to at least all other network devices in said set;

determining an upper network device is directly above a lower network device in said set by detecting within each network device in said set if a packet from only one other network device was received on a particular port; and in response to said determination, executing the steps of:
marking said lower network device as a downstream network device in a topology table within said upper network device determined to be directly above said lower network device; and
silencing said lower network device by removing said lower network device from said set.

2. The method as claimed in claim 1, said method further comprising the steps of:

determining when no downstream network devices remain; and ceasing to send multicast packets when no downstream network devices remain.

3. The method as claimed in claim 1 wherein said step of silencing said lower network device comprises sending a quench packet to said downstream network device.

4. The method as claimed in claim 3 further comprising the step of:

receiving a quench packet within said lower network device from said upper network device, after receiving said quench packet from said upper network device performing the substeps of:
marking said upper network device as an upstream device in a topology table within said lower network device; and
ceasing to send packets from said lower network device to all other network devices in said network.

5. The method as claimed in claim 4 wherein said step of receiving a quench packet further comprises the substep of:

sending a response packet to said upstream network device.

6. The method as claimed in claim 1 wherein upstream devices continue to send quench packets to downstream network devices after said computer network topology has been mapped.

7. The method as claimed in claim 1 wherein if a network device sends a multicast packet to all other devices in the network after all network devices downstream from other network devices have been detected, said steps sending, determining, marking, and silencing, are performed again.

8. The method as claimed in claim 1 wherein said step of sending is implemented by a sending thread in said network device and said steps of detecting and handling are implemented by a receiving thread.

9. A network device for automatically determining the topology of a computer network, said computer network comprising a plurality of network devices coupled together, said network device comprising:

a processor;

a memory coupled to said processor;

at least one network port, said network port coupled to another network device;

a sending thread executing on said processor, said sending thread sending packets from said network device to other network devices in said network unless said network device has been silenced; and a receiving thread executing on said processor, said receiving thread receiving packets from other network devices, if only one other network device is detected on a network port then marking said only one other network device as a downstream network device in a topology table in said network device and silencing said downstream network device.

10. The network device as claimed in claim 9 wherein said sending thread ceases sending packets to all other network devices when no downstream network devices remain.

11. The network device as claimed in claim 9 wherein said receiving thread silences said downstream network device by sending a quench packet to said downstream network device.

12. The network device as claimed in claim 9 wherein said receiving thread receives a quench packet from an upstream network device and in response to said quench packet marks said upstream network device in said topology table.

13. The network device as claimed in claim 12 wherein said sending thread stops sending packets to all other network devices after receiving thread receives a quench packet from said upstream network device.

14. The network device as claimed in claim 13 wherein said sending thread sends a response packet back to said upstream network device.

15. A computer network, said computer network comprising a plurality of network devices, each of said network devices having at least one network port coupled to another network device through a communication line, each of said network devices in said computer network starting in a set of all network devices then repeating the following steps until all network devices downstream from other network devices are detected:

sending packets from network devices in said set to at least all other network devices in said set;

determining an upper network device is directly above a lower network in said set by detecting if a packet from only one other network device was received on a particular network port; and in response to said determination, executing the steps of:

marking said lower network device as a downstream network device in a topology table within said upper network device determined to be directly above said lower network device;

silencing said lower network device by removing said lower network device from said set.

* * * * *